(12) United States Patent
Bachu et al.

(10) Patent No.: US 8,964,621 B2
(45) Date of Patent: Feb. 24, 2015

(54) TRANSMISSION AND RECEPTION OF A REFERENCE SIGNAL SUPPORTING POSITIONING IN A WIRELESS COMMUNICATION NETWORK

(75) Inventors: Raja Sekhar Bachu, Somerset, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1142 days.

(21) Appl. No.: 12/772,714

(22) Filed: May 3, 2010

(65) Prior Publication Data

US 2011/0116436 A1     May 19, 2011

Related U.S. Application Data

(60) Provisional application No. 61/176,695, filed on May 8, 2009.

(51) Int. Cl.
| | | |
|---|---|---|
| *H04H 1/00* | (2006.01) | |
| *H04J 3/24* | (2006.01) | |
| *H04L 5/00* | (2006.01) | |

(52) U.S. Cl.
CPC ............ *H04L 5/0053* (2013.01); *H04L 5/0048* (2013.01); *H04L 5/0051* (2013.01)
USPC ........................................................ 370/312

(58) Field of Classification Search
CPC ....................................................... H04W 4/06
See application file for complete search history.

(56) References Cited

U.S. PATENT DOCUMENTS

| | | | |
|---|---|---|---|
| 7,099,625 B1 * | 8/2006 | Yoshida | 455/62 |
| 8,130,857 B2 * | 3/2012 | Kim et al. | 375/267 |
| 8,249,029 B2 * | 8/2012 | Palanki et al. | 370/335 |
| 8,493,924 B2 * | 7/2013 | Kwon et al. | 370/329 |

(Continued)

FOREIGN PATENT DOCUMENTS

| | | |
|---|---|---|
| CN | 101076001 A | 11/2007 |
| CN | 101335969 A | 12/2008 |

(Continued)

OTHER PUBLICATIONS

International Search Report and Written Opinion—PCT/US2010/034068—International Search Authority, European Patent Office, Aug. 30, 2010.

(Continued)

*Primary Examiner* — Robert C Scheibel
*Assistant Examiner* — Prenell Jones
(74) *Attorney, Agent, or Firm* — Linda G. Gunderson

(57) ABSTRACT

Techniques for transmitting and receiving a reference signal in a wireless network are described. In one design, a UE may generate multiple transmissions of a reference signal at multiple frequency locations. The UE may send the transmissions of the reference signal in multiple symbol periods of at least one subframe. The UE may send at least two transmissions of the reference signal in each subframe, e.g., one transmission of the reference signal in each symbol period of a subframe. Each transmission of the reference signal may cover a portion of the bandwidth of the reference signal and may be sent on a set of contiguous subcarriers at a particular frequency location. The multiple transmissions of the reference signal may cover the entire bandwidth of the reference signal. A location estimate for the UE may be determined based on time of arrivals (TOAs) of the reference signal measured by multiple receiver stations.

44 Claims, 7 Drawing Sheets

(56) References Cited

U.S. PATENT DOCUMENTS

| | | | |
|---|---|---|---|
| 2002/0028680 A1 | 3/2002 | Jenkins et al. | |
| 2003/0054813 A1 | 3/2003 | Riley et al. | |
| 2007/0072600 A1* | 3/2007 | Cho et al. | 455/423 |
| 2009/0046570 A1* | 2/2009 | Sarkar et al. | 370/203 |
| 2009/0122731 A1* | 5/2009 | Montojo et al. | 370/280 |
| 2009/0247172 A1* | 10/2009 | Palanki et al. | 455/447 |
| 2009/0252077 A1* | 10/2009 | Khandekar et al. | 370/312 |
| 2009/0316811 A1 | 12/2009 | Maeda et al. | |
| 2010/0014501 A1* | 1/2010 | Kowalewski | 370/342 |
| 2010/0062783 A1* | 3/2010 | Luo et al. | 455/450 |
| 2010/0103906 A1* | 4/2010 | Montojo et al. | 370/335 |
| 2010/0165931 A1* | 7/2010 | Nimbalker et al. | 370/329 |
| 2010/0182903 A1 | 7/2010 | Palanki et al. | |
| 2010/0195566 A1* | 8/2010 | Krishnamurthy et al. | 370/328 |
| 2010/0220808 A1* | 9/2010 | Kishigami et al. | 375/295 |
| 2010/0260284 A1* | 10/2010 | Yoshii et al. | 375/295 |
| 2010/0279707 A1 | 11/2010 | Fischer et al. | |
| 2011/0032888 A1 | 2/2011 | Matsumoto et al. | |
| 2011/0075630 A1* | 3/2011 | Riess | 370/331 |
| 2011/0275392 A1* | 11/2011 | Haustein et al. | 455/500 |
| 2011/0299625 A1* | 12/2011 | Hooli et al. | 375/295 |
| 2012/0008588 A1* | 1/2012 | Chung et al. | 370/329 |

FOREIGN PATENT DOCUMENTS

| | | |
|---|---|---|
| JP | 2000050343 A | 2/2000 |
| JP | 2001508262 A | 6/2001 |
| JP | 2009533941 A | 9/2009 |
| JP | 2010538569 A | 12/2010 |
| WO | 9834381 A1 | 8/1998 |
| WO | 2007117127 A1 | 10/2007 |
| WO | WO-2008156293 A2 | 12/2008 |
| WO | 2009022474 A1 | 2/2009 |
| WO | 2009031862 A2 | 3/2009 |

OTHER PUBLICATIONS

Nortel: "Discussions on UE positioning issues" 3GPP Draft; RI-091911(N0rtel-discuss-UE-Position), 3rd Generation Partnership Project (3GPP), Mobile Competence Centre ; 650, Route Des Lucioles ; F-06921 Sophia-Antipolis Cedex ; France, no. San Francisco, U.

Nortel: "LTE neighbor cell hearability" 3GPP Draft; RI-090765 (Nortel-Neighbor-Hearability), 3rd Generation Partnership Project (3GPP), Mobile Competence Centre ; 650, Route Des Lucioles ; F-06921 Sophia-Antipolis Cedex ; France, no. Athens, Greece; 20090.

QUALCOMM Europe: "Positioning Performance and Design of PA-RS" 3GPP Draft; RI-092207 Positioning Update, 3rd Generation Partnership Project (3GPP), Mobile Competence Centre ; 650, Route Des Lucioles ; F-06921 Sophia-Antipolis Cedex ; France, no. San Franc.

ZTE: "Positioning PRS design in LTE R9" 3GPP Draft; RI-091704 Positioning PRS Design in LTE R9, 3rd Generation Partnership Project (3GPP), Mobile Competence Centre ; 650, Route Des Lucioles ; F-06921 Sophia-Antipolis Cedex ; France, no. San Francisco, USA.

* cited by examiner

TRANSMISSION AND RECEPTION OF A REFERENCE SIGNAL SUPPORTING POSITIONING IN A WIRELESS COMMUNICATION NETWORK

CLAIM OF PRIORITY UNDER 35 U.S.C. §119

The present Application for Patent claims priority to Provisional U.S. Application Ser. No. 61/176,695, entitled "METHOD AND APPARATUS FOR GENERATING A REFERENCE SIGNAL SUPPORTING POSITIONING IN A WIRELESS COMMUNICATION NETWORK," filed May 8, 2009, and expressly incorporated herein by reference.

BACKGROUND

I. Field

The present disclosure relates generally to communication, and more specifically to techniques for transmitting and receiving a reference signal in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A UE may transmit a reference signal on the uplink to base stations within detection range of the UE. A reference signal is a signal that is known a priori by a transmitter and a receiver and may also be referred to as a pilot signal, a pilot, a preamble, etc. It may be desirable to transmit the reference signal such that it can be used for various purposes such as channel estimation, positioning, etc.

SUMMARY

Techniques for transmitting and receiving a reference signal that may be used for channel estimation, positioning, and/or other purposes are described herein. In one design, a UE may generate a plurality of transmissions of a reference signal at a plurality of frequency locations. The UE may send the plurality of transmissions of the reference signal in a plurality of symbol periods of at least one subframe and may send at least two transmissions of the reference signal in each subframe. In one design, the UE may send the transmissions of the reference signal in different symbol periods of a single subframe, e.g., one transmission of the reference signal in each symbol period of the subframe. In one design, each transmission of the reference signal may cover a portion of the bandwidth of the reference signal, and the plurality of transmissions of the reference signal may cover the entire bandwidth of the reference signal. In one design, each transmission of the reference signal may be sent on a set of contiguous subcarriers at a particular frequency location.

In one design, the reference signal may be used for positioning. A plurality of receiver stations may receive the transmissions of the reference signal from the UE. Each receiver station may determine a time of arrival (TOA) of the reference signal at that receiver station based on the received transmissions of the reference signal. A location estimate for the UE may be determined based on a plurality of TOAs of the reference signal obtained by the plurality of receiver stations using an uplink time difference of arrival (U-TDOA) positioning method. The reference signal may also be used for other purposes.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
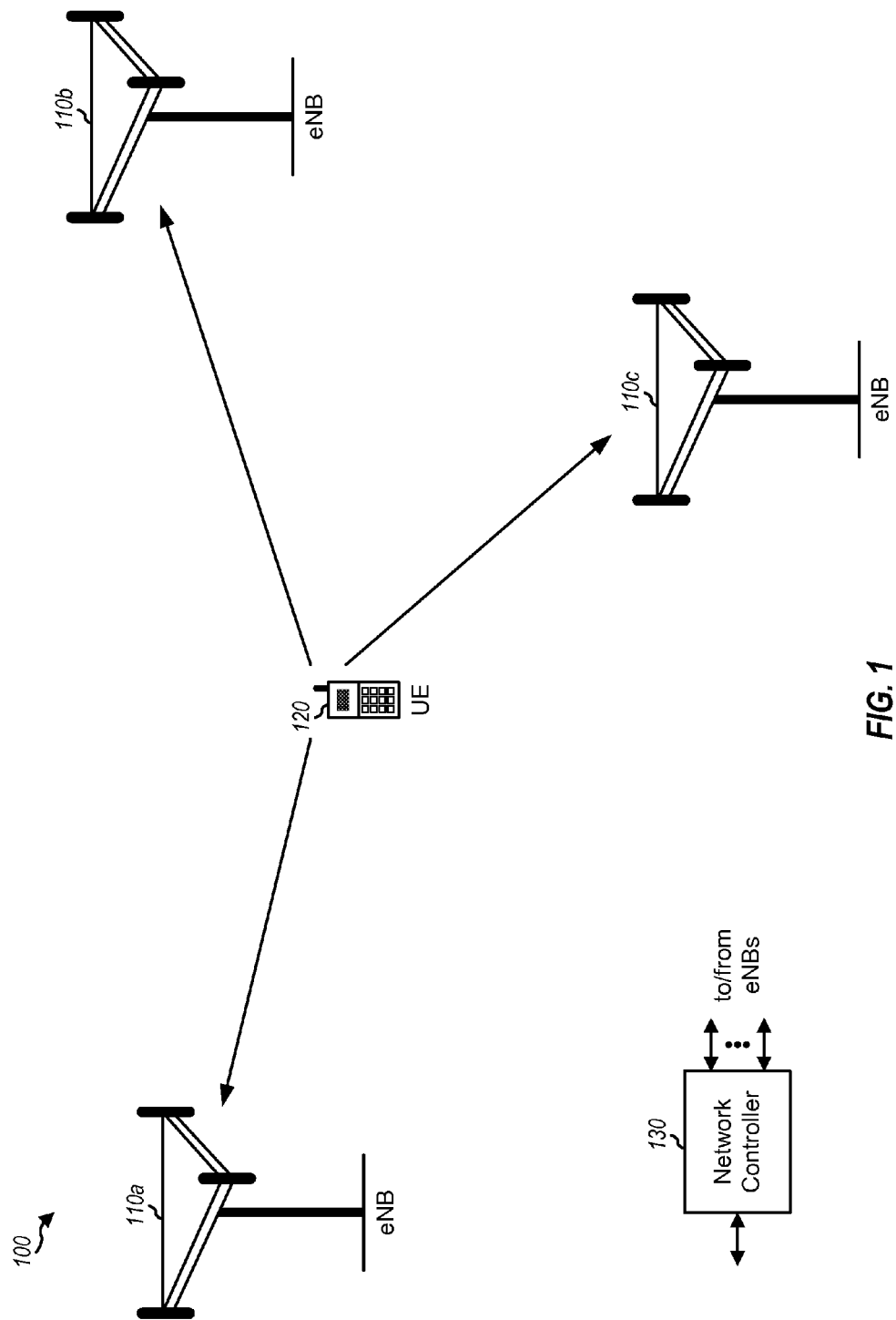
FIG. 1 shows a wireless communication network.

FIG. 1 shows a wireless communication network 100, which may be an Evolved Universal Terrestrial Radio Access Network (E-UTRAN) in LTE or some other wireless network. Wireless network 100 may include a number of evolved Node Bs (eNBs) and other network entities. For simplicity, only three eNBs 110a, 110b and 110c and one network controller 130 are shown in FIG. 1. An eNB may be an entity that communicates with the UEs and may also be referred to as a Node B, a base station, an access point, etc. Each eNB 110 may provide communication coverage for a particular geographic area. The overall coverage area of an eNB may be partitioned into multiple (e.g., three) smaller areas, and each smaller area may be served by a respective eNB subsystem. In 3GPP, the term "cell" can refer to the smallest coverage area of an eNB and/or an eNB subsystem serving this coverage area. In 3GPP2, the term "sector" or "cell-sector" can refer to the smallest coverage area of a base station and/or a base station subsystem serving this coverage area. For clarity, 3GPP concept of cell is used in the description below.

Network controller 130 may couple to a set of eNBs and provide coordination and control for these eNBs. Network controller 130 may communicate with the eNBs via a backhaul, e.g., an X2 interface in LTE. The eNBs may also communicate with one another, e.g., directly or indirectly via wireless or wireline backhaul.

A number of UEs may be dispersed throughout wireless network 100, and each UE may be stationary or mobile. For simplicity, FIG. 1 shows only one UE 120. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. FIG. 1 shows uplink transmission from UE 120 to eNBs 110a, 110b and 110c. Downlink transmissions from the eNBs to the UE are not shown in FIG. 1.

Figure 2:
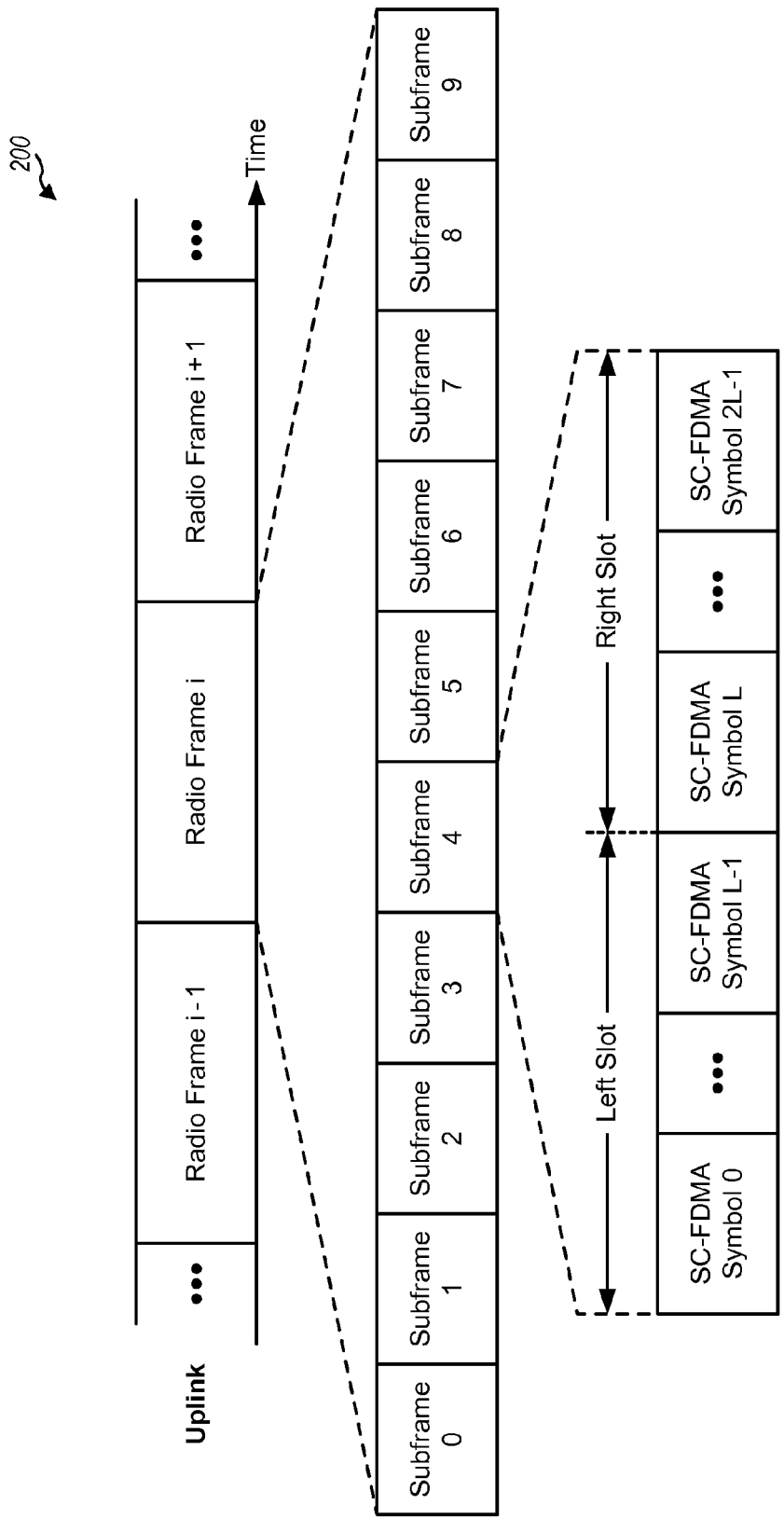
FIG. 2 shows an exemplary frame structure.

FIG. 2 shows a frame structure 200 for the uplink in LTE. The transmission timeline may be partitioned into units of radio frames. Each radio frame may have a predetermined duration, e.g., 10 milliseconds (ms), and may be partitioned into 10 subframes with indices of 0 through 9. Each subframe may include two slots, and each slot may include L symbol periods. L may be equal to 6 for an extended cyclic prefix or 7 for a normal cyclic prefix in LTE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are transmitted in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.4, 3, 5, 10 or 20 megahertz (MHz), respectively.

The time-frequency resources available for each of the downlink and uplink may be partitioned into resource blocks. Each resource block may cover 12 subcarriers in one slot and may include a number of resource elements. Each resource element may cover one subcarrier in one symbol period and may be used to send one modulation symbol, which may be a real or complex value. On the uplink, 2L SC-FDMA symbols may be transmitted in symbol periods 0 through 2L−1 of each subframe, as shown in FIG. 2. On the downlink, 2L OFDM symbols may be transmitted in symbol periods 0 through 2L−1 of each subframe (not shown in FIG. 2).

LTE supports transmission of a sounding reference signal (SRS) by a UE on the uplink. A sounding reference signal is a reference signal that may be transmitted periodically by a transmitter to allow a receiver to estimate the response of a wireless channel from the transmitter to the receiver.

Figure 3:
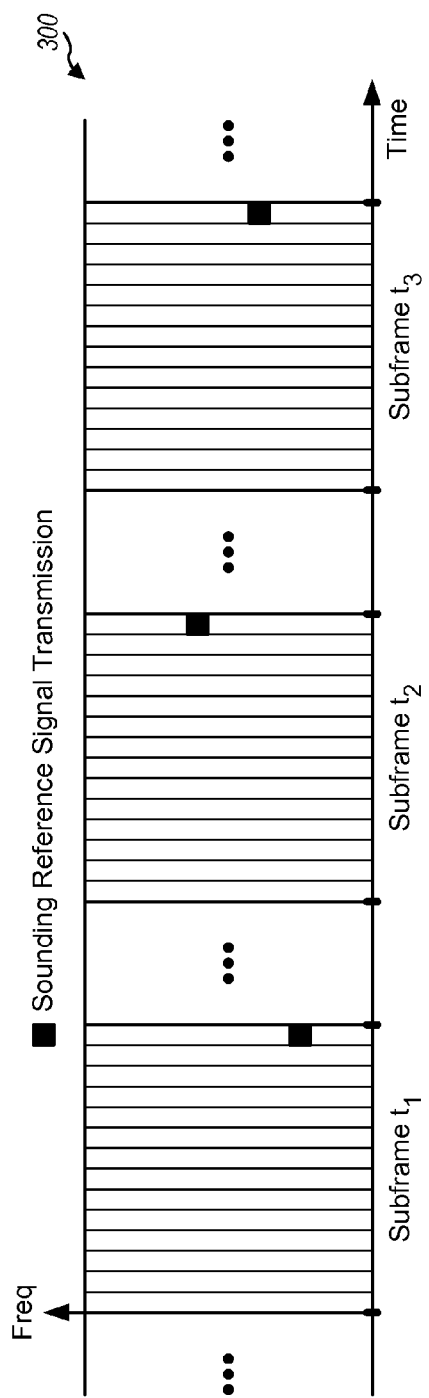
FIG. 3 shows an exemplary transmission of a reference signal.

FIG. 3 shows an exemplary transmission 300 of a sounding reference signal by a UE on the uplink in LTE. The UE may be configured to transmit the sounding reference signal in one symbol period of each SRS subframe. An SRS subframe is a subframe in which the sounding reference signal is transmitted. The UE may also be configured to transmit the sounding reference signal in a particular bandwidth, which may be referred to as the SRS bandwidth. In general, the SRS bandwidth may cover all or a portion of the system bandwidth. A wider SRS bandwidth may enable channel estimation over a wider range of frequencies.

The UE may transmit the sounding reference signal with frequency hopping (as shown in FIG. 3) or without frequency hopping (not shown in FIG. 3). If frequency hopping is enabled, then the UE may transmit the sounding reference signal at different frequency locations in different SRS subframes. This may allow an eNB to estimate the uplink channel response across the system bandwidth based on the sounding reference signal transmitted by the UE. The UE may generate the sounding reference signal as described in 3GPP TS 36.211, entitled "Evolved Universal Terrestrial Radio Access (E-UTRA); Physical Channels and Modulation," which is publicly available.

In an aspect, a sounding reference signal may be designed and used to support positioning of a UE. Positioning refers to a process to determine a geographical location of a UE. The UE may transmit the sounding reference signal on the uplink. Multiple receiver stations (e.g., eNBs, location measurement units (LMUs), etc.) at different locations may receive the sounding reference signal from the UE. Each receiver station may determine a TOA of the sounding reference signal at that receiver station. Different receiver stations may measure different TOAs for the sounding reference signal from the UE due to different locations and propagation times for these receiver stations. A U-TDOA positioning method can calculate the location of the UE based on differences in TOAs of the sounding reference signal for different receiver stations and their known locations. The TOA measurements from different receiver stations may be combined in a manner similar to a downlink triangulation method to determine the UE location.

In general, U-TDOA may be implemented on the network side using various signals transmitted on the uplink. For example, U-TDOA may be implemented in the E-UTRAN using the sounding reference signal, or a random access preamble signal transmitted on a Physical Random Access Channel (PRACH), or some other signal. In general, the time resolution/accuracy of TOA measurement for a given signal may be dependent on the bandwidth of the signal, and progressively finer time resolution may be obtained for progressively wider signal bandwidth. The random access preamble signal may be transmitted in a bandwidth of approximately 1 MHz and may thus have limited time accuracy, which may then translate to limited accuracy for a location estimate for a UE. The sounding reference signal may be transmitted across the entire system bandwidth and may thus avoid the bandwidth limitation of the random access preamble signal. However, if the sounding reference signal is transmitted across all or a large portion of the system bandwidth in one symbol period, then the available transmit power of the UE would be spread over more subcarriers, and each subcarrier would have lower transmit power. The sounding reference signal may then be received with poor signal quality by some receiver stations.

Figure 4:
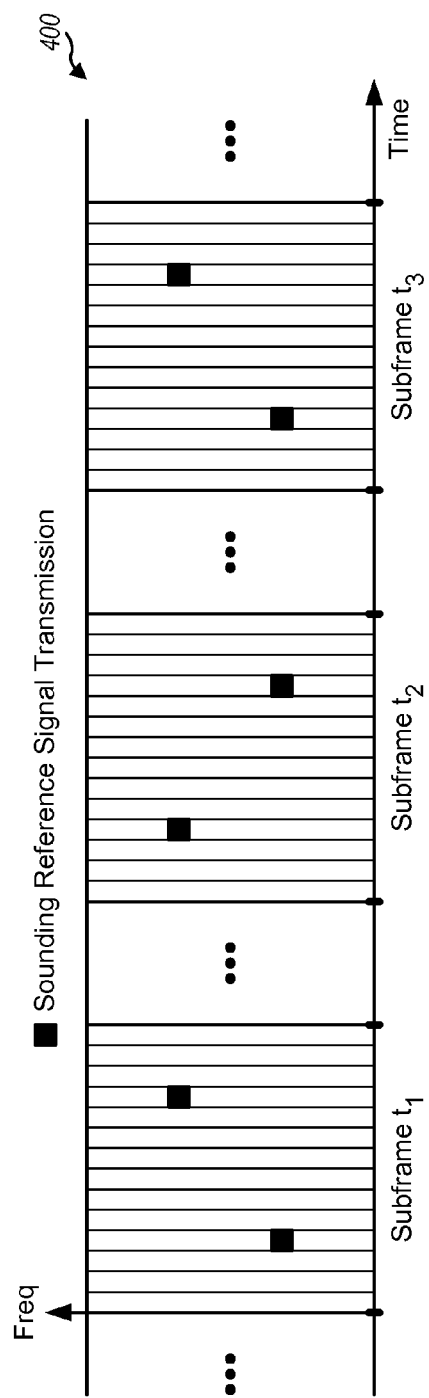
FIGS. 4 and 5 two exemplary designs of an improved reference signal that may provide better performance for U-TDOA.

FIG. 4 shows a design of a sounding reference signal 400 that may provide better performance for U-TDOA. In this design, the sounding reference signal may be transmitted in two SRS symbol periods of a subframe. An SRS symbol period is a symbol period in which the sounding reference signal is transmitted. The sounding reference signal may also be transmitted on a set of contiguous subcarriers at a different frequency location in each SRS symbol period of a subframe. The sounding reference signal may occupy all or some of the subcarriers in the set.

A transmission of the sounding reference signal on a set of subcarriers in a symbol period may be referred to as an SRS transmission, an SRS burst, a pilot burst, etc. In the design shown in FIG. 4, two SRS transmissions are sent at two frequency locations in two symbol periods of a subframe. More than two SRS transmissions may also be sent at more than two frequency locations and/or in more than two symbol periods of a subframe.

In one design, SRS transmissions may be sent at different frequency locations in the same symbol periods of each SRS subframe, as shown in FIG. 4. In general, SRS transmissions may be sent (i) at fixed or variable frequency locations in different symbol periods of an SRS subframe, (ii) at fixed or variable frequency locations in different SRS subframes, and (iii) in fixed or variable symbol periods of different SRS subframes.

Figure 5:
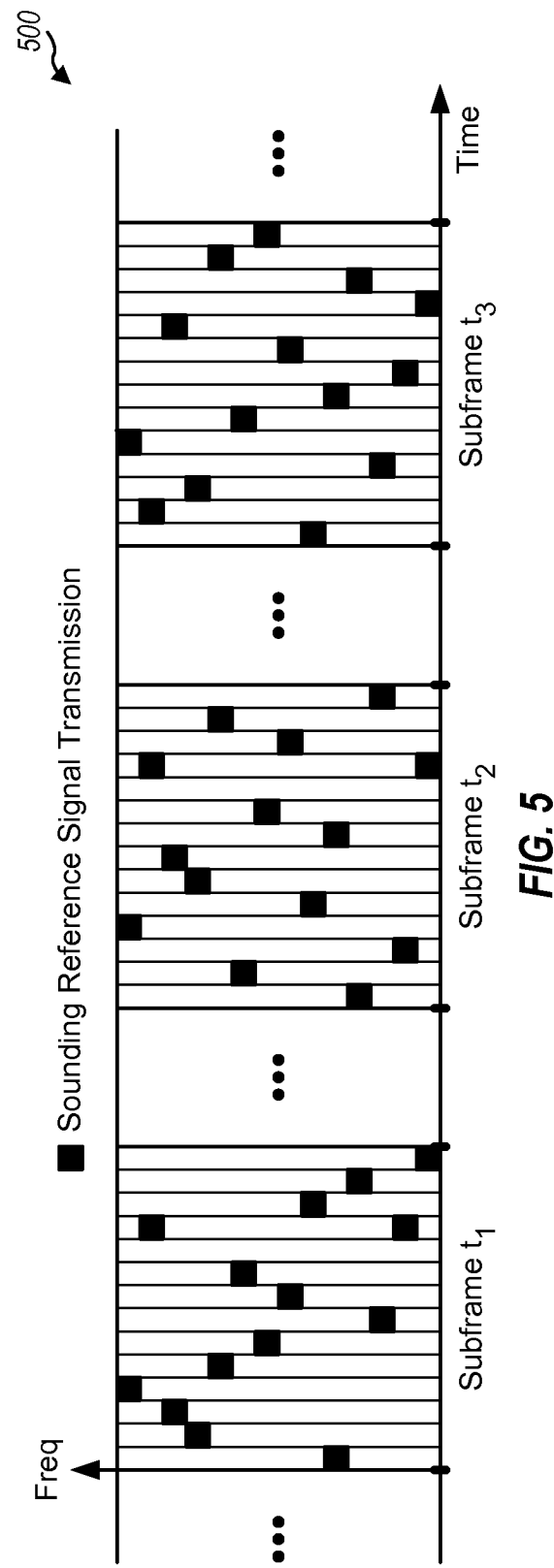

FIG. 5 shows a design of a sounding reference signal 500 that may also provide better performance for U-TDOA. In this design, the sounding reference signal may be transmitted in each symbol period of a subframe. Furthermore, the sounding reference signal may be transmitted on a set of contiguous subcarriers at a different frequency location in each symbol period. The frequency locations for the sounding reference signal may be selected based on a pseudo-random number (PN) sequence, or a predetermined pattern, or some other means.

In one design, different patterns of frequency locations versus symbol periods may be used for different SRS subframes, as shown in FIG. 5. In another design, a fixed pattern of frequency locations versus symbol periods may be used for all SRS subframes.

In one design, the sounding reference signal may be transmitted on contiguous subcarriers, which may preserve a single-carrier waveform for SC-FDMA and may result in a lower peak-to-average-power ratio (PAPR) for an SRS transmission. The lower PAPR may allow the SRS transmission to be sent at a higher transmit power level, which may be desirable. In another design, the sounding reference signal may be transmitted on non-contiguous subcarriers. For example, M sets of non-contiguous subcarriers may be defined, with each set including subcarriers spaced apart by M subcarriers. The sounding reference signal may be transmitted on different sets of non-contiguous subcarriers in different symbol periods. For clarity, much of the description herein is for the design in which the sounding reference signal is transmitted on sets of contiguous subcarriers.

In one design, the sounding reference signal may be transmitted on all subcarriers in the set of subcarriers. In another design, the sounding reference signal may be transmitted on some subcarriers in the set of subcarriers. For example, the sounding reference signal may be transmitted on 2, 3, 4, or 6 subcarriers in each resource block. This may allow more transmit power to be used for each subcarrier used for SRS transmission.

For the designs shown in FIGS. 4 and 5, the sounding reference signal may be transmitted on a set of subcarriers in each SRS symbol period. In one design, the number of subcarriers in the set may be fixed, e.g., regardless of the SRS bandwidth. In another design, the number of subcarriers in the set may be configurable and may be dependent on various factors such as the SRS bandwidth configured for the UE, the available transmit power of the UE, the location of the UE, etc.

It may be desirable to transmit the sounding reference signal across a large bandwidth (e.g., across the entire system bandwidth), so that good time resolution can be obtained for TOA measurements by receiver stations. It may also be desirable to scan the entire SRS bandwidth within a particular time interval, which may be given by a particular number of symbol periods. This time interval should be within the coherence time of a wireless channel, so that SRS transmissions sent in different symbol periods can be coherently combined. Coherence time is a time duration in which the response of a wireless channel may be assumed to be relatively unchanged.

The amount of time needed to scan the entire SRS bandwidth may be dependent on the SRS bandwidth, the number of subcarriers in each set, and the interval between SRS symbol periods. For example, the SRS bandwidth may cover 110 resource blocks for 20 MHz system bandwidth. If the set of subcarriers covers one resource block, then the entire 20 MHz system bandwidth may be scanned in 110 SRS symbol periods. If one SRS symbol period is available in each subframe (e.g., as shown in FIG. 3), then the entire system bandwidth may be scanned in 110 subframes or 110 ms. This scan period may be much longer than a typical coherence time of a wireless channel. In this case, it may not be possible to coherently combine the SRS transmissions sent in one scan period. However, if the sounding reference signal is transmitted in each symbol period of a subframe (e.g., as shown in FIG. 5), then the entire system bandwidth may be scanned in about 8 subframes. Furthermore, if the sounding reference signal is transmitted on a set of subcarriers covering 8 resource blocks (instead of just one resource block) in each SRS symbol period, then the entire 20 MHz system bandwidth may be scanned in one subframe.

In general, transmitting the sounding reference signal on more subcarriers in each SRS symbol period and/or in more SRS symbol periods of each subframe may allow the SRS bandwidth to be scanned more quickly, which may be desirable. However, transmitting the sounding reference signal on more subcarriers in each SRS symbol period may result in less transmit power per subcarrier, which may in turn result in lower received quality for the sounding reference signal at the receiver stations. The converse may be true if the sounding reference signal is transmitted on fewer subcarriers in each SRS symbol period. The number of subcarriers to use for SRS transmission in each SRS symbol period may be selected based on a tradeoff between scan speed and received quality.

FIGS. 4 and 5 show two exemplary designs of intra-subframe narrowband sounding reference signal that may provide better performance for U-TDOA. The term "intra-subframe" refers to the sounding reference signal being transmitted in multiple symbol periods of a subframe. The term "narrowband" refers to the sounding reference signal being transmitted on only a small fraction of the K total subcarriers in any given symbol period. The set of subcarriers used for an SRS transmission may be selected based on pseudo-random hopping (as shown in FIG. 5) or a predetermined pattern.

In general, the sounding reference signal may be transmitted in multiple symbol periods of a subframe. This may allow a receiver station to coherently combine SRS transmissions received in multiple symbol periods, which may provide coherent combining gain and hence improved detection performance. Furthermore, the sounding reference signal may be transmitted at different frequency locations within the subframe. This may allow for TOA estimation with better time resolution. In one design, a single SRS transmission may be sent on a single set of subcarriers in a given symbol period, as shown in FIGS. 4 and 5. In another design, multiple SRS transmissions may be sent on different sets of subcarriers at different frequency locations in a given symbol period. For both designs, the sounding reference signal may be transmitted on a small subset of the K total subcarriers, and higher transmit power may be used for each subcarrier used to transmit the sounding reference signal. This may allow the sounding reference signal to be received with higher power and better received quality by receiver stations.

In one design, a UE may be scheduled for transmitting the sounding reference signal by a designated entity, e.g., by its serving cell. The UE may then transmit the sounding reference signal as scheduled. The designated entity may select an SRS configuration for the UE for transmitting the sounding reference signal. For example, the designated entity may select the SRS bandwidth, the number of subcarriers for each SRS transmission, the SRS symbol periods, the SRS subframes, etc. The designated entity may convey the SRS configuration to other receiver stations (e.g., via the X2 interface in LTE) to enable these receiver stations to receive and process the SRS transmissions from the UE.

In one design, multiple UEs may concurrently transmit their sounding reference signals on different sets of subcarriers in the same SRS symbol period. In this design, different UEs may be frequency division multiplexed at different frequency locations in each SRS symbol period. In another design, multiple UEs may concurrently transmit their sounding reference signals on the same set of subcarriers in the same SRS symbol period. These UEs may be code division multiplexed and may be assigned different orthogonal codes, e.g., different cyclic shifts of a CAZAC (constant amplitude zero auto correlation) sequence such as a Zadoff-Chu sequence. Multiple UEs may also be multiplexed for their sounding reference signals in other manners.

Figure 6:
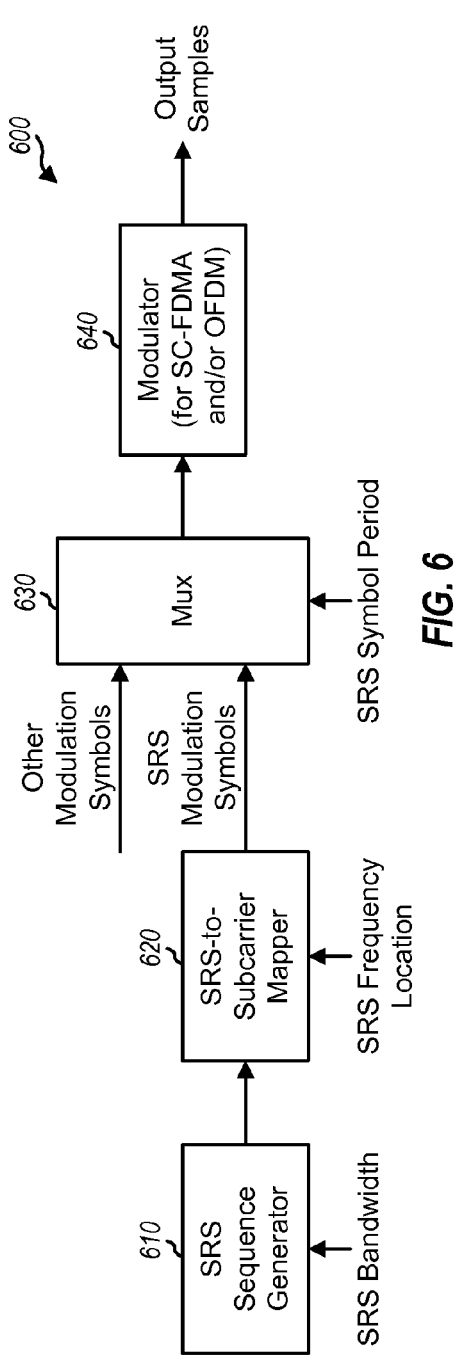
FIG. 6 shows a block diagram of a transmitter for the improved reference signal.

FIG. 6 shows a block diagram of a design of a transmitter 600 for a sounding reference signal. Within transmitter 600, an SRS sequence generator 610 may receive an indication of the SRS bandwidth and may generate an SRS sequence comprising a sufficient number of SRS modulation symbols. Each SRS modulation symbol may be a real or complex value to be transmitted on one resource element. The SRS sequence may be generated based on a PN sequence, a CAZAC sequence, or some other sequence having good characteristics, e.g., low PAPR, flat spectral response, good correlation properties, low receiver processing complexity, etc. The length of the SRS sequence may be dependent on the number of subcarriers used to transmit the sounding reference signal, which may be indicated by the SRS bandwidth. An SRS-to-subcarrier mapper 620 may receive an indication of the frequency location of the sounding reference signal in a given symbol period and may map the sequence of SRS modulation symbols to a set of subcarriers at the proper frequency location.

Mapper 620 may also map zero symbols with a signal value of zero to subcarriers not used for transmission. A multiplexer (Mux) 630 may receive the SRS modulation symbols from mapper 620 at a first input and other modulation symbols at a second input. The other modulation symbols may comprise data symbol, control symbols, etc. Multiplexer 630 may time division multiplex (TDM) the sounding reference signal with other transmissions on the uplink and may provide (i) the SRS modulation symbols in each SRS symbol period and (ii) the other modulation symbols in remaining symbol periods. Multiplexer 630 may also multiplex the SRS modulation symbols and the other modulation symbols in other manners. A modulator 640 may receive the modulation symbols from multiplexer 630 in each symbol period and may generate an SC-FDMA symbol, an OFDM symbol, or some other symbol for the symbol period. An SC-FDMA symbol or an OFDM symbol may comprise K+C samples to be transmitted in K+C sample periods of one symbol period, where K is the total number of subcarriers and C is the cyclic prefix length. The processing to generate an SC-FDMA symbol or an OFDM symbol is described in the aforementioned 3GPP 36-211.

Figure 7:
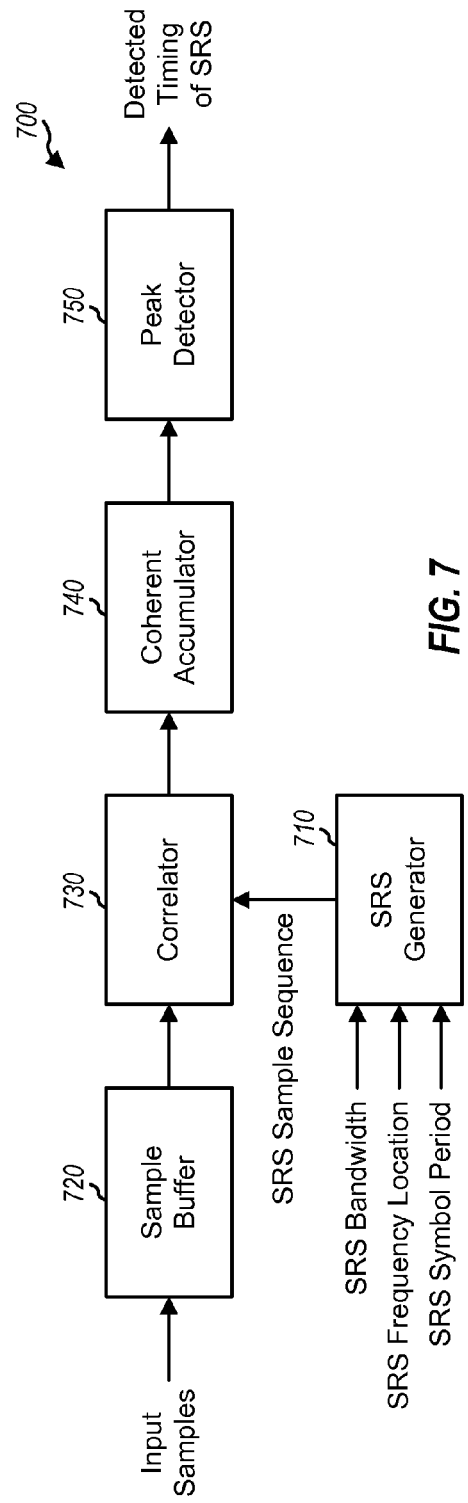
FIG. 7 shows a block diagram of a receiver for the improved reference signal.

FIG. 7 shows a block diagram of a design of an SRS receiver 700 at a receiver station, which may be an eNB or an LMU. The receiver station may be informed (e.g., via the X2 interface) of a UE configured to transmit an intra-subframe narrowband sounding reference signal. The receiver station may then detect for the sounding reference signal from the UE. Alternatively, the receiver station may blindly detect for sounding reference signals from different UEs.

Within SRS receiver 700, an SRS generator 710 may include SRS sequence generator 610, SRS-to-subcarrier mapper 620, and modulator 640 in FIG. 6. SRS generator 710 may receive various parameters for the sounding reference signal of the UE. These parameters may include the SRS bandwidth, the SRS frequency location, the SRS symbol period, the number of subcarriers for each SRS transmission, etc. SRS generator 710 may generate an SRS sample sequence for each SRS symbol period based on the received parameters. The SRS sample sequence for each SRS symbol period may correspond to an SC-FDMA symbol or an OFDM symbol comprising at least one SRS transmission on at least one set of subcarriers.

A sample buffer 720 may receive and store input samples and may provide appropriate input samples to a correlator 730. Correlator 730 may correlate the input samples from buffer 720 for different SRS symbol periods with the SRS sample sequences from SRS generator 710 for these SRS symbol periods. For each SRS symbol period, correlator 730 may correlate the input samples for that SRS symbol period with the SRS sample sequence for the SRS symbol period at different time offsets, which may correspond to different sample periods or different sub-sample periods. For each time offset, correlator 730 may correlate the input samples with the SRS sample sequence at that time offset and may provide a correlation output for the time offset. Correlator 730 may obtain a set of correlation outputs for different SRS symbol periods for each time offset. For each time offset, a coherent accumulator 740 may accumulate the correlation outputs for all SRS symbol periods and provide a correlation result for that time offset. A peak detector 750 may receive the correlation results for all time offsets, detect a peak based on the correlation results, and provide the time offset corresponding to the detected peak as the detected timing of the sounding reference signal for the UE. The detected peak may be the correlation result with the largest magnitude, or the earliest correlation result with a magnitude exceeding a particular threshold, or a correlation result defined in other manners. The detected timing of the sounding reference signal may correspond to the TOA of the sounding reference signal from the UE at the receiver station.

Sending SRS transmissions in multiple symbol periods of the same subframe may allow the receiver station to coherently combine received SRS transmissions across these symbol periods, as shown in FIG. 7. This may improve the received signal quality of the sounding reference signal. It may or may not be possible to coherently combine SRS transmissions sent in different subframes due to variations in the response of a wireless channel across subframes. In general, SRS transmissions received within the coherence time of the wireless channel may be coherently combined. The coherence time of the wireless channel may be dependent on mobility of the UE, mobility of the receiver station, and/or other factors.

In the exemplary design shown in FIG. 7, correlator 730 performs correlation for each SRS symbol period, and accumulator 740 performs coherent accumulation across SRS symbol periods. In another design, correlation and coherent accumulation may be combined. In this design, SRS generator 710 may generate an extended SRS sample sequence for all SRS symbol periods to be coherently combined. Correlator 730 may correlate the input samples for all SRS symbol periods with the extended SRS sample sequence at different time offsets and may provide a correlation result for each time offset.

Figures 8, 9:
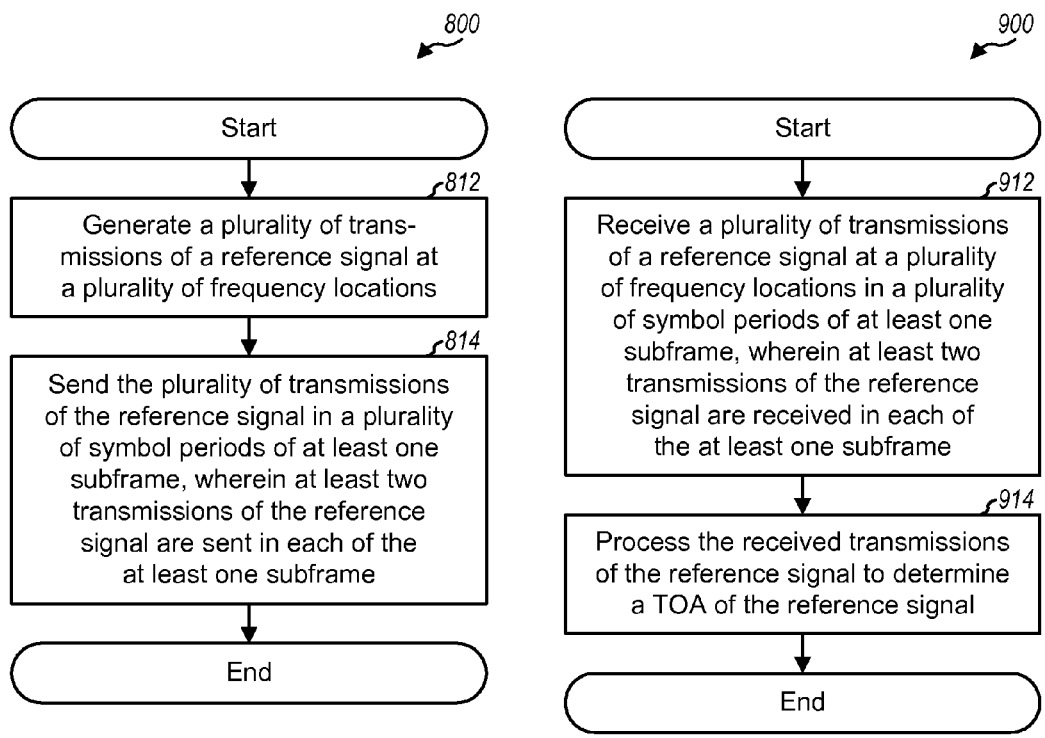
FIG. 8 shows a process for transmitting a reference signal.
FIG. 9 shows a process for receiving a reference signal.

FIG. 8 shows a design of a process 800 for transmitting a reference signal in a wireless communication network. Process 800 may be performed by a UE (as described below) or by some other transmitter station. The UE may generate a plurality of transmissions of a reference signal at a plurality of frequency locations (block 812). The UE may send the plurality of transmissions of the reference signal in a plurality of symbol periods of at least one subframe (block 814). The UE may send at least two transmissions of the reference signal in each of the at least one subframe. In one design, the UE may send the transmissions of the reference signal in different symbol periods of a single subframe, e.g., one transmission of the reference signal in each symbol period of the subframe, as shown in FIG. 5. In another design, the UE may send the transmissions of the reference signal in different symbol periods of multiple subframes, e.g., in a subset of the symbol periods in each subframe, as shown in FIG. 4.

In one design, each transmission of the reference signal may cover a portion of a bandwidth of the reference signal, which may be equal to the system bandwidth or smaller. The plurality of transmissions of the reference signal may cover the entire bandwidth of the reference signal. In one design, each transmission of the reference signal may be sent on a set of contiguous subcarriers at a particular frequency location. The set of contiguous subcarriers may include a configurable number of subcarriers, which may be determined based on the bandwidth of the reference signal and/or other factors. In another design, each transmission of the reference signal may be sent on a set of non-contiguous subcarriers. For both designs, the reference signal sequence may be transmitted on all or some of the subcarriers in the set.

In one design of block 812, the UE may generate the plurality of transmissions of the reference signal at different frequency locations, one transmission of the reference signal at each frequency location, e.g., as shown in FIG. 5. The UE may generate the plurality of transmissions of the reference signal at pseudo-random frequency locations in the plurality of symbol periods, e.g., as shown in FIG. 5. In one design, the UE may generate a sequence of symbols, e.g., based on a PN sequence, a Zadoff-Chu sequence, or some other sequence. For each transmission of the reference signal, the UE may map symbols in the sequence of symbols to a set of subcarriers at a frequency location selected for the transmission of the reference signal.

In one design, the UE may generate an SC-FDMA symbol or an OFDM symbol for each of the plurality of symbol periods. Each SC-FDMA symbol or OFDM symbol may comprise at least one transmission of the reference signal for at least one frequency location, e.g., one transmission of the reference signal for each frequency location. The UE may send the plurality of transmissions of the reference signal to a plurality of receiver stations, which may include at least one base station and/or at least one LMU.

In one design, the reference signal may be used for positioning. A plurality of TOAs of the reference signal may be obtained by the plurality of receiver stations based on the transmissions of the reference signals from the UE. A location estimate for the UE may be determined based on the plurality of TOAs of the reference signal using an U-TDOA positioning method. The reference signal may also be used for other purposes.

FIG. 9 shows a design of a process 900 for receiving a reference signal in a wireless communication network. Process 900 may be performed by a receiver station, which may be a base station/eNB, an LMU, etc. The receiver station may receive a plurality of transmissions of a reference signal at a plurality of frequency locations in a plurality of symbol periods of at least one subframe (block 912). The receiver station may receive at least two transmissions of the reference signal in each of the at least one subframe. The receiver may process the received transmissions of the reference signal to determine a TOA of the reference signal (block 914).

In one design, each transmission of the reference signal may cover a portion of a bandwidth of the reference signal, and the plurality of transmissions of the reference signal may cover the entire bandwidth. In one design, each transmission of the reference signal may be sent on a set of contiguous or non-contiguous subcarriers. The reference signal may be received on all or some of the subcarriers in the set.

In one design of block 912, the receiver station may receive the plurality of transmissions of the reference signal in different symbol periods of a single subframe, e.g., one transmission of the reference signal in each symbol period of the subframe, as shown in FIG. 5. In another design, the receiver station may receive the plurality of transmissions of the reference signal in different symbol periods of multiple subframes, e.g., in a subset of the symbol periods in each subframe, as shown in FIG. 4. In one design, the receiver station may receive the plurality of transmissions of the reference signal at different frequency locations, e.g., one transmission of the reference signal at each frequency location, as shown in FIG. 5. In one design, the receiver station may receive the plurality of transmissions of the reference signal at pseudo-random frequency locations in the plurality of symbol periods, e.g., as shown in FIG. 5.

In one design of block 914, the receiver station may generate a plurality of sample sequences for the plurality of symbol periods. Each sample sequence may comprise at least one transmission of the reference signal for at least one frequency location in one symbol period. Each sample sequence may correspond to an SC-FDMA symbol or an OFDM symbol comprising at least one transmission of the reference signal in one symbol period. The receiver station may correlate the received transmissions of the reference signal with the plurality of sample sequences at different time offsets. In one design, for each time offset, the receiver station may (i) correlate each received transmission of the reference signal with a corresponding sample sequence at that time offset and (ii) coherently combine correlation outputs across the plurality of symbol periods to obtain a correlation result for the time offset. The receiver may determine the TOA of the reference signal based on correlation results for different time offsets. For example, the receiver station may detect for a peak in the correlation results for different time offsets and may determine the TOA based on a time offset corresponding to the detected peak.

In one design, the reference signal may be used for positioning. A UE may send the plurality of transmissions of the reference signal. A plurality of receiver stations may receive the transmissions of the reference signals from the UE and may determine a plurality of TOAs of the reference signal. A location estimate for the UE may be determined based on the plurality of TOAs of the reference signal using an U-TDOA positioning method. In one design, each receiver station may send its TOA of the reference signal to a network entity (e.g., network controller 130 in FIG. 1), which may determine the location estimate for the UE based on the TOAs from all receiver stations. In another design, a serving base station may receive the TOAs of the reference signal from other receiver stations and may determine the location estimate for the UE. The reference signal may also be used for other purposes.

Figure 10:
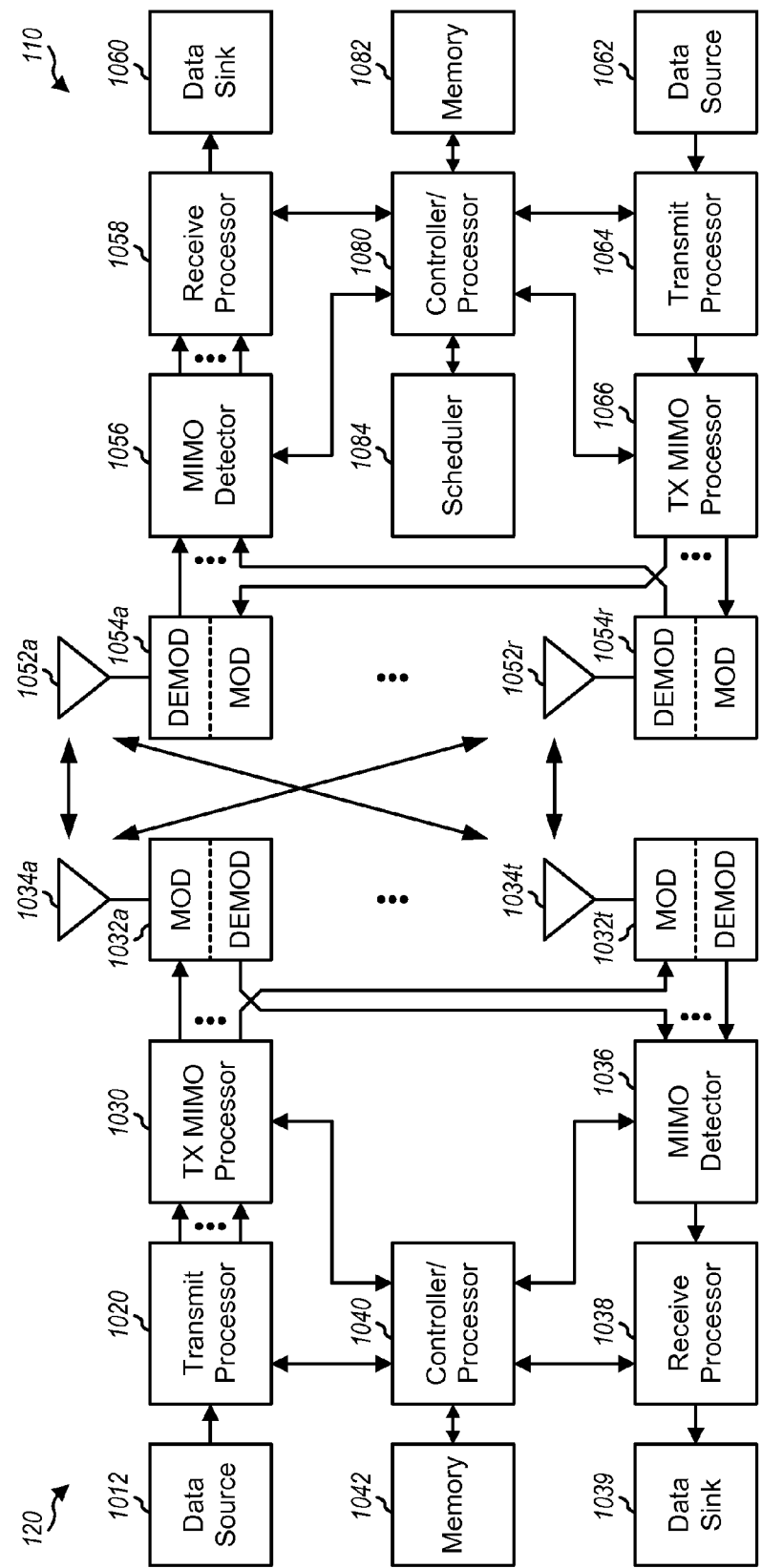
FIG. 10 shows a block diagram of a UE and a base station.

FIG. 10 shows a block diagram of a design of UE 120 and a base station/eNB 110, which may be one of the base stations/eNBs in FIG. 1. UE 120 may be equipped with T antennas 1034a through 1034t, and base station 110 may be equipped with R antennas 1052a through 1052r, where in general T≥1 and R≥1.

At UE 120, a transmit processor 1020 may receive data from a data source 1012, process (e.g., encode, interleave, and symbol map) the data, and provide data symbols. Transmit processor 1020 may also process control information from a controller/processor 1040 and provide control symbols. Transmit processor 1020 may also generate SRS modulation symbols for a sounding reference signal and/or other reference signals or pilots. Transmit processor 1020 may implement part of transmitter 600 in FIG. 6. A transmit (TX) multiple-input multiple-output (MIMO) processor 1030 may perform precoding on the data symbols, the control symbols, and/or the SRS reference modulation symbols, if applicable. Processor 1030 may provide T output symbol streams to T modulators (MODs) 1032a through 1032t. Each modulator 1032 may process a respective output symbol stream (e.g., for SC-FDMA, OFDM, etc.) to obtain an output sample stream. Each modulator 1032 may further process (e.g., convert to analog, amplify, filter, and upconvert) the output sample stream to obtain an uplink signal. T uplink signals from modulators 1032a through 1032t may be transmitted via T antennas 1034a through 1034t, respectively.

At base station 110, antennas 1052a through 1052r may receive the uplink signals from UE 120 and may provide received signals to demodulators (DEMODs) 1054a through 1054r, respectively. Each demodulator 1054 may condition (e.g., filter, amplify, downconvert, and digitize) a respective received signal to obtain input samples. Each demodulator 1054 may further process the input samples (e.g., for SC-FDMA, OFDM, etc.) to obtain received symbols. A MIMO detector 1056 may obtain received symbols from all R demodulators 1054a through 1054r, perform receiver spatial processing on the received symbols if applicable, and provide detected symbols. A receive processor 1058 may process (e.g., demodulate, deinterleave, and decode) the detected symbols, provide decoded data to a data sink 1060, and provide decoded control information to a controller/processor 1080. Demodulator 1054 and/or processor 1058 may detect for the sounding reference signal from UE 120 and may determine the TOA of the sounding reference signal. Demodulator 1054 and/or processor 1058 may implement SRS receiver 700 in FIG. 7.

On the downlink, at base station 110, a transmit processor 1064 may receive and process data from a data source 1062 and control information from controller/processor 1080. Transmit processor 1064 may also generate modulation symbols for reference signals. The symbols from transmit processor 1064 may be precoded by a TX MIMO processor 1066 if applicable, further processed by modulators 1054a through 1054r, and transmitted to UE 120. At UE 120, the downlink signals from base station 110 may be received by antennas 1034, processed by demodulators 1032, detected by a MIMO detector 1036 if applicable, and further processed by a receive processor 1038 to obtain decoded data and control information transmitted to UE 120.

Controllers/processors 1040 and 1080 may direct the operation at UE 120 and base station 110, respectively. Processor 1020, processor 1040, and/or other processors and modules at UE 120 may perform or direct process 800 in FIG. 8 and/or other processes for the techniques described herein. Processor 1058, processor 1080, and/or other processors and modules at base station 110 may perform or direct process 900 in FIG. 9 and/or other processes for the techniques described herein. Memories 1042 and 1082 may store data and program codes for UE 120 and base station 110, respectively. A scheduler 1084 may schedule UEs for data transmission on the downlink and/or uplink, may schedule UEs for transmission of sounding reference signals, and may provide resource grants for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. A computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   generating, by user equipment, a plurality of transmissions of a reference signal at a plurality of frequency locations; and
   sending, by the user equipment, the plurality of transmissions of the reference signal in a plurality of symbol periods of at least one subframe, wherein at least two transmissions of the reference signal are sent in each of the at least one subframe;
   wherein the sending the plurality of transmissions of the reference signal comprises sending the plurality of transmissions of the reference signal in different symbol periods of a single subframe, one transmission of the reference signal in each symbol period of the subframe.

2. The method of claim 1, wherein each transmission of the reference signal covers a portion of a bandwidth of the reference signal, and wherein the plurality of transmissions of the reference signal cover entire bandwidth of the reference signal.

3. The method of claim 1, wherein each transmission of the reference signal is sent on a set of contiguous subcarriers at a particular frequency location.

4. The method of claim 3, wherein the set of contiguous subcarriers includes a configurable number of subcarriers determined based on a bandwidth of the reference signal.

5. The method of claim 1, wherein the generating the plurality of transmissions of the reference signal comprises generating the plurality of transmissions of the reference signal at different frequency locations, one transmission of the reference signal at each frequency location.

6. The method of claim 1, wherein the generating the plurality of transmissions of the reference signal comprises generating the plurality of transmissions of the reference signal at pseudo-random frequency locations in the plurality of symbol periods.

7. The method of claim 1, wherein the generating the plurality of transmissions of the reference signal comprises
   generating a sequence of symbols, and
   for each transmission of the reference signal, mapping symbols in the sequence of symbols to a set of subcarriers at a frequency location selected for the transmission of the reference signal.

8. The method of claim 7, wherein the generating the sequence of symbols comprises generating the sequence of symbols based on a pseudo-random number (PN) sequence or a Zadoff-Chu sequence.

9. The method of claim 1, further comprising:
   generating a single-carrier frequency division multiple access (SC-FDMA) symbol for each of the plurality of symbol periods, each SC-FDMA symbol comprising at least one transmission of the reference signal for at least one frequency location.

10. The method of claim 1, further comprising:
    generating an orthogonal frequency division multiplex (OFDM) symbol for each of the plurality of symbol periods, each OFDM symbol comprising at least one transmission of the reference signal for at least one frequency location.

11. The method of claim 1, wherein the sending the plurality of transmissions of the reference signal comprises sending the plurality of transmissions of the reference signal from the user equipment (UE) to a plurality of receiver stations comprising at least one base station, or at least one location measurement unit (LMU), or both.

12. The method of claim 11, wherein a plurality of time of arrivals (TOAs) of the reference signal are obtained by the plurality of receiver stations based on the plurality of transmissions of the reference signals from the UE, and wherein a location estimate for the UE is determined based on the plurality of TOAs of the reference signal using an uplink time difference of arrival (U-TDOA) positioning method.

13. An apparatus for wireless communication comprising:
    means for generating, by user equipment, a plurality of transmissions of a reference signal at a plurality of frequency locations; and
    means for sending, by user equipment, the plurality of transmissions of the reference signal in a plurality of symbol periods of at least one subframe, wherein at least two transmissions of the reference signal are sent in each of the at least one subframe;
    wherein the means for sending the plurality of transmissions of the reference signal comprises means for sending the plurality of transmissions of the reference signal in different symbol periods of a single subframe, one transmission of the reference signal in each symbol period of the subframe.

14. The apparatus of claim 13, wherein the means for generating the plurality of transmissions of the reference signal comprises means for generating the plurality of transmissions of the reference signal at different frequency locations, one transmission of the reference signal at each frequency location.

15. The apparatus of claim 13, wherein the means for generating the plurality of transmissions of the reference signal comprises
 means for generating a sequence of symbols, and
 means for mapping symbols in the sequence of symbols to a set of subcarriers at a frequency location selected for each transmission of the reference signal.

16. An apparatus for wireless communication, comprising:
 user equipment containing at least one processor configured to generate a plurality of transmissions of a reference signal at a plurality of frequency locations, and to send the plurality of transmissions of the reference signal in a plurality of symbol periods of at least one subframe, wherein at least two transmissions of the reference signal are sent in each of the at least one subframe;
 wherein the at least one processor is configured to send the plurality of transmissions of the reference signal in different symbol periods of a single subframe, one transmission of the reference signal in each symbol period of the subframe.

17. The apparatus of claim 16, wherein the at least one processor is configured to generate the plurality of transmissions of the reference signal at different frequency locations, one transmission of the reference signal at each frequency location.

18. The apparatus of claim 16, wherein the at least one processor is configured to generate a sequence of symbols and to map symbols in the sequence of symbols to a set of subcarriers at a frequency location selected for each transmission of the reference signal.

19. A computer program product, comprising:
 a non-transitory computer-readable medium comprising:
  code for causing at least one computer to generate, at user equipment, a plurality of transmissions of a reference signal at a plurality of frequency locations, and
  code for causing the at least one computer to send, from the user equipment, the plurality of transmissions of the reference signal in a plurality of symbol periods of at least one subframe, wherein at least two transmissions of the reference signal are sent in each of the at least one subframe;
  wherein the code for causing the at least one computer to send the plurality of transmissions of the reference signal causes the plurality of transmissions of the reference signal to be sent in different symbol periods of a single subframe, one transmission of the reference signal in each symbol period of the subframe.

20. A method for wireless communication, comprising:
 receiving a plurality of transmissions of a reference signal at a plurality of frequency locations in a plurality of symbol periods of at least one subframe, wherein at least two transmissions of the reference signal are received in each of the at least one subframe; and
 processing the received transmissions of the reference signal to determine a time of arrival (TOA) of the reference signal;
 wherein the receiving the plurality of transmissions of the reference signal comprises receiving the plurality of transmissions of the reference signal in different symbol periods of a single subframe, one transmission of the reference signal in each symbol period of the subframe.

21. The method of claim 20, wherein each transmission of the reference signal covers a portion of a bandwidth of the reference signal, and wherein the plurality of transmissions of the reference signal cover entire bandwidth of the reference signal.

22. The method of claim 20, wherein the receiving the plurality of transmissions of the reference signal comprises receiving the plurality of transmissions of the reference signal at different frequency locations, one transmission of the reference signal at each frequency location.

23. The method of claim 20, wherein the receiving the plurality of transmissions of the reference signal comprises receiving the plurality of transmissions of the reference signal at pseudo-random frequency locations in the plurality of symbol periods.

24. The method of claim 20, wherein the processing the received transmissions of the reference signal comprises
 generating a plurality of sample sequences for the plurality of symbol periods, each sample sequence comprising at least one transmission of the reference signal for at least one frequency location in one symbol period,
 correlating the received transmissions of the reference signal with the plurality of sample sequences at different time offsets, and
 determining the TOA of the reference signal based on correlation results for the different time offsets.

25. The method of claim 24, wherein the correlating the received transmissions of the reference signal comprises, for each time offset,
 correlating each received transmission of the reference signal with a corresponding sample sequence at the time offset, and
 coherently combining correlation outputs across the plurality of symbol periods to obtain a correlation result for the time offset.

26. The method of claim 24, wherein the determining the TOA of the reference signal comprises
 detecting for a peak in the correlation results for the different time offsets, and
 determining the TOA based on a time offset corresponding to the detected peak.

27. The method of claim 20, wherein the plurality of transmissions of the reference signal are sent by a user equipment (UE) and received by a plurality of receiver stations, wherein a plurality of TOAs of the reference signal are obtained by the plurality of receiver stations based on the plurality of transmissions of the reference signals from the UE, and wherein a location estimate for the UE is determined based on the plurality of TOAs of the reference signal using an uplink time difference of arrival (U-TDOA) positioning method.

28. An apparatus for wireless communication, comprising:
 means for receiving a plurality of transmissions of a reference signal at a plurality of frequency locations in a plurality of symbol periods of at least one subframe, wherein at least two transmissions of the reference signal are received in each of the at least one subframe; and
 means for processing the received transmissions of the reference signal to determine a time of arrival (TOA) of the reference signal;
 wherein the means for receiving the plurality of transmissions of the reference signal comprises means for receiving the plurality of transmissions of the reference signal in different symbol periods of a single subframe, one transmission of the reference signal in each symbol period of the subframe.

29. The apparatus of claim 28, wherein the means for processing the received transmissions of the reference signal comprises
 means for generating a plurality of sample sequences for the plurality of symbol periods, each sample sequence comprising at least one transmission of the reference signal for at least one frequency location in one symbol period, means for correlating the received transmissions of the reference signal with the plurality of sample sequences at different time offsets, and means for determining the TOA of the reference signal based on correlation results for the different time offsets.

30. The apparatus of claim 29, wherein the means for correlating the received transmissions of the reference signal comprises, for each time offset, means for correlating each received transmission of the reference signal with a corresponding sample sequence at the time offset, and means for coherently combining correlation outputs across the plurality of symbol periods to obtain a correlation result for the time offset.

31. The apparatus of claim 28, wherein the plurality of transmissions of the reference signal are sent by a user equipment (UE) and received by a plurality of receiver stations, wherein a plurality of TOAs of the reference signal are obtained by the plurality of receiver stations based on the plurality of transmissions of the reference signals from the UE, and wherein a location estimate for the UE is determined based on the plurality of TOAs of the reference signal using an uplink time difference of arrival (U-TDOA) positioning method.

32. An apparatus for wireless communication, comprising:

at least one processor configured to receive a plurality of transmissions of a reference signal at a plurality of frequency locations in a plurality of symbol periods of at least one subframe, wherein at least two transmissions of the reference signal are received in each of the at least one subframe, and to process the received transmissions of the reference signal to determine a time of arrival (TOA) of the reference signal;

wherein the at least one processor is configured to receive the plurality of transmissions of the reference signal in different symbol periods of a single subframe, one transmission of the reference signal in each symbol period of the subframe.

33. The apparatus of claim 32, wherein the at least one processor is configured to generate a plurality of sample sequences for the plurality of symbol periods, each sample sequence comprising at least one transmission of the reference signal for at least one frequency location in one symbol period, to correlate the received transmissions of the reference signal with the plurality of sample sequences at different time offsets, and to determine the TOA of the reference signal based on correlation results for the different time offsets.

34. The apparatus of claim 33, wherein for each time offset, the at least one processor is configured to correlate each received transmission of the reference signal with a corresponding sample sequence at the time offset, and to coherently combine correlation outputs across the plurality of symbol periods to obtain a correlation result for the time offset.

35. The apparatus of claim 32, wherein the plurality of transmissions of the reference signal are sent by a user equipment (UE) and received by a plurality of receiver stations, wherein a plurality of TOAs of the reference signal are obtained by the plurality of receiver stations based on the plurality of transmissions of the reference signals from the UE, and wherein a location estimate for the UE is determined based on the plurality of TOAs of the reference signal using an uplink time difference of arrival (U-TDOA) positioning method.

36. A computer program product, comprising:

a non-transitory computer-readable medium comprising:

code for causing at least one computer to receive a plurality of transmissions of a reference signal at a plurality of frequency locations in a plurality of symbol periods of at least one subframe, wherein at least two transmissions of the reference signal are received in each of the at least one subframe, and code for causing the at least one computer to process the received transmissions of the reference signal to determine a time of arrival (TOA) of the reference signal;

wherein the code for causing the at least one computer to receive the plurality of transmissions of the reference signals causes the at least one computer to receive the plurality of transmissions of the reference signal in different symbol periods of a single subframe, one transmission of the reference signal in each symbol period of the subframe.

37. The method of claim 1, wherein different patterns of frequency locations versus symbol periods are used for different subframes in sending transmissions of the reference signal.

38. The apparatus of claim 13, wherein the means for sending the plurality of transmissions of the reference signal uses different patterns of frequency locations versus symbol periods for different subframes in sending transmissions of the reference signal.

39. The apparatus of claim 16, wherein the at least one processor is configured to use different patterns of frequency locations versus symbol periods for different subframes in sending transmissions of the reference signal.

40. The non-transitory computer-readable medium of claim 19, wherein the code for causing the at least one computer to send the plurality of transmissions of the reference signal causes the at least one computer to use different patterns of frequency locations versus symbol periods for different subframes in sending transmissions of the reference signal.

41. The method of claim 20, wherein different patterns of frequency locations versus symbol periods are used for different subframes in receiving transmissions of the reference signal.

42. The apparatus of claim 28, wherein the means for receiving the plurality of transmissions of the reference signal uses different patterns of frequency locations versus symbol periods for different subframes in receiving transmissions of the reference signal.

43. The apparatus of claim 32, wherein the at least one processor is configured to use different patterns of frequency locations versus symbol periods for different subframes in receiving transmissions of the reference signal.

44. The non-transitory computer-readable medium of claim 36, wherein the code for causing the at least one computer to receive the plurality of transmissions of the reference signal causes the at least one computer to use different patterns of frequency locations versus symbol periods for different subframes in receiving transmissions of the reference signal.

* * * * *